(12) United States Patent
Tanaka

(10) Patent No.: US 8,092,126 B2
(45) Date of Patent: Jan. 10, 2012

(54) INDEXABLE DRILL

(75) Inventor: Shogo Tanaka, Anpachi-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 1139 days.

(21) Appl. No.: 11/909,819

(22) PCT Filed: Mar. 28, 2006

(86) PCT No.: PCT/JP2006/307007
§ 371 (c)(1),
(2), (4) Date: Sep. 27, 2007

(87) PCT Pub. No.: WO2006/104239
PCT Pub. Date: Oct. 5, 2006

(65) Prior Publication Data
US 2009/0067942 A1    Mar. 12, 2009

(30) Foreign Application Priority Data
Mar. 29, 2005    (JP) ................................. 2005-094310

(51) Int. Cl.
*B23B 51/02*    (2006.01)
(52) U.S. Cl. .......................... 408/231; 408/230; 408/233
(58) Field of Classification Search .................. 408/231, 408/233, 230, 226, 17
See application file for complete search history.

(56) References Cited

U.S. PATENT DOCUMENTS

| | | | |
|---|---|---|---|
| 4,728,231 A | 3/1988 | Kunimori et al. | |
| 4,744,704 A | 5/1988 | Galvefors et al. | |
| 5,149,233 A * | 9/1992 | Kress et al. | 408/199 |
| 5,154,549 A | 10/1992 | Isobe et al. | |
| 5,228,812 A | 7/1993 | Noguchi et al. | |
| 5,904,455 A | 5/1999 | Krenzer et al. | |
| 5,957,631 A | 9/1999 | Hecht | |
| 6,059,492 A | 5/2000 | Hecht | |
| 6,196,769 B1 * | 3/2001 | Satran et al. | 407/40 |
| 6,514,019 B1 * | 2/2003 | Schulz | 408/59 |
| 2003/0103824 A1 * | 6/2003 | Hansson et al. | 408/231 |
| 2006/0033255 A1 * | 2/2006 | Yonezawa et al. | 269/309 |

FOREIGN PATENT DOCUMENTS

JP     3054444 U    9/1998
(Continued)

OTHER PUBLICATIONS

Japanese Office Action mailed on Jun. 8, 2010 for the corresponding Japanese Patent Application No. 2005-094310.

*Primary Examiner* — Daniel Howell
*Assistant Examiner* — Paul M Janeski
(74) *Attorney, Agent, or Firm* — Leason Ellis LLP.

(57) ABSTRACT

An indexable drill is offered which enables suitable integration of a drill body and cutting insert. The crosshatch angles of clamp receiving faces of a cutting insert which are respectively pressed by clamp faces and of torque receiving faces which cross the clamp receiving faces and are adjacent thereto and to which is transmitted the rotary force of the drill body from the torque transmission faces are formed smaller within a range of 2° or less which is less than the crosshatch angles of clamp faces which clamp and hold the cutting insert of the drill body and torque transmission faces which cross these clamp faces and are adjacent thereto and which transmit the rotary force of the drill body to the cutting insert.

4 Claims, 5 Drawing Sheets

FOREIGN PATENT DOCUMENTS

| | | |
|---|---|---|
| JP | 2002-501441 A | 1/2002 |
| JP | 2002-511028 A | 4/2002 |
| JP | 2004-223702 A | 8/2004 |
| JP | 2004-2232702 A | 8/2004 |
| JP | 2004-283932 A | 10/2004 |
| JP | 2004-330390 A | 11/2004 |
| JP | 2004-330391 A | 11/2004 |
| JP | 2004-2232702 | 12/2004 |
| WO | WO 99/56902 | 11/1999 |

\* cited by examiner

INDEXABLE DRILL

CROSS REFERENCE TO RELATED APPLICATIONS

This is a U.S. national phase application under 35 U.S.C. §371 of International Patent Application No. PCT/JP2006/307007, filed Mar. 28, 2006 and claims the benefit of Japanese Application 2005-094310, filed Mar. 29, 2005. The International Application was published in Japanese on Oct. 5, 2006 as International Publication No. WO 2006/104239 under PCT Article 21(2) the contents of which are incorporated herein in their entirety.

TECHNICAL FIELD

The present invention relates to an indexable drill which removably attaches a cutting insert that has cutting edges at its tip on the distal side of the drill body.

BACKGROUND ART

Heretofore, as a cutting tool used in perforation machining of workpieces, what is referred to as an indexable drill has been used, which removably attaches a cutting insert having cutting edges at its tip on the distal side of the drill body. With this indexable drill, it has only been possible to conduct repetitive machining by replacing the cutting inserts provided with cutting edges, which become worn by the cutting of workpieces.

With respect to this type of indexable drill, at the tip of an approximately cylindrical rod-like drill body which rotates around an axis is formed a recessed part (cutting insert mount) which is recessed toward the proximal side, a cutting insert is fitted into this recessed part, and the drill body and cutting insert are integrated (e.g., see Japanese Registered Utility Model No. 3054444). In this indexable drill, on the inner surface of the recessed part of the drill body are formed a bottom face which faces the distal side, and which is orthogonal to the axis of the drill body, a pair of clamp faces which arranged on mutually opposing sides sandwiching the axis so as to face the inner circumferential side of the drill body while crossing this bottom face, and which clamp and hold the cutting insert, and torque transmission faces which arranged on mutually opposing sides sandwiching the axis so as to face the forward side of the drill rotation direction and which transmit the rotary force of the drill body to the cutting insert. Moreover, the paired clamp faces are respectively crossed by and adjacent to the paired torque transmission faces facing the backward side of the drill rotation direction from the inner circumferential side of the drill body.

The cutting insert has cutting edges formed at the tip of its insert body which is formed from cemented carbide such as sintered hard alloy. Furthermore, it forms on its proximal side a pair of clamp receiving faces which fit into the recessed part of the drill body and which receive the clamping force from the pair of clamp faces, and torque receiving faces to which are transmitted the rotary force of the drill body from the pair of torque transmission faces. The paired clamp receiving faces are respectively crossed by and adjacent to the paired torque receiving faces.

In this indexable drill, the crosshatch angles of the clamp faces and torque transmission faces of the drill body and the crosshatch angles of the clamp receiving faces and torque receiving faces of the cutting insert are equal, and fit together to integrate.

At the same time, in the indexable drill, a slit is formed in the drill body which extends from the bottom face in the axial direction on the proximal side so as to include the axis and parallel the axis, and the distal side of the drill body is divided into two parts which are respectively provided with one each of the clamp faces and torque transmission faces (e.g., see Japanese Unexamined Patent Application, First Publication No. 2004-330391). In this type of indexable drill, an insertion hole is formed so as to extend across the slit, and spiral machining of a female screw is conducted on the inner face thereof. By screwing a male screw member (clamping screw) into this insertion hole, it is possible to vary the size of the interstice of the slit. In short, it is possible to elastically deform the bifurcated tip parts and vary the interstice between the opposing faces of each tip part according to the depth to which the male screw member is screwed into the insertion hole. By this means, it is possible to have the clamp faces firmly press the clamp receiving faces of the cutting insert that is inserted into the recessed part of the drill body, and to clamp and hold the cutting insert.

Moreover, in the insertion hole, a screw part is provided which is contacted by the head of the clamping screw when said screw is loosened. By having the head contact this screw part, it is possible to enlarge the interstice of the slit, and facilitate attachment and removal of the cutting insert in the recessed part of the drill body.

However, with the aforementioned indexable drill, as the crosshatch angles of the clamp receiving faces and torque receiving faces of the cutting insert are identical to the crosshatch angles of the clamp faces and torque transmission faces of the drill body, the problem arises that if these faces are not formed with a high degree of accuracy, it may happen that adherence between these faces is impaired, that the transmitted clamping force is reduced, and that attachment rigidity of the cutting inserts in the drill body cannot be fully maintained. Furthermore, in such cases, there is the problem that the mutual axes of the drill body and cutting insert may be deviated during attachment of the cutting insert. Accordingly, when such problems occur, they result in impairment of the accuracy of machined holes.

Moreover, in the aforementioned indexable drill, the clamping screw which changes the size of the interstice of the slit and the female screw of the insertion hole into which is screwed the screw part contacted by the head of the clamping screw are female screws which both have the same direction as, for example, a right-hand screw. Consequently, when the clamping screw is loosened whereby the head of the clamping screw is made to contact the screw part in order to enlarge the interstice of the slit, there is the problem that the screw part is driven by the rotation of the clamping screw. In such cases, there is the problem that it may happen that the screw part is removed from the insertion hole, that the interstice of the slit cannot be enlarged, and that the cutting insert cannot be suitably attached and removed.

Furthermore, as the slit is open in the state where the cutting insert is integrated with the drill body, there is the problem that a resonance phenomenon occurs inside the space formed by the slit during cutting, and that a very loud cutting noise occurs. It may also happen that chip is ingested by the slit, damaging the inner face of the machined hole.

In addition, with the aforementioned indexable drill, when, for example, stainless steel material or the like is subjected to cutting, it may happen that a strong tightening force is imposed on the drill from the machined hole, and that cutting resistance becomes large, impeding the conduct of stable cutting. Furthermore, even when the drill body is withdrawn after formation of the machined hole, there is the problem that interference with the machined hole may occur, rendering it impossible to suitably withdraw the drill.

In light of the foregoing circumstances, the primary object of the present invention is to offer an indexable drill which is capable of suitably integrating the drill body and cutting insert with a high degree of attachment rigidity and attachment accuracy.

Moreover, a second object of the present invention is to offer an indexable drill which enables suitable attachment and removal of the cutting insert relative to the drill body, without having the screw part driven by the rotation of the clamping screw.

Furthermore, a third object of the present invention is to offer an indexable drill which effects mitigation of cutting noise during cutting, and which prevents damage to the machined hole from the ingestion of chip into the slit.

In addition, a fourth object of the present invention is to offer an indexable drill which enables the conduct of stable cutting by mitigating cutting resistance during cutting and interference during withdrawal.

SUMMARY OF THE INVENTION

The present invention offers the following means in order to achieve the aforementioned primary objective.

The indexable drill of the present invention is an indexable drill including an approximately cylindrical rod-like drill body which rotates around an axis, and a cutting insert which has cutting edges at its tip and which is removably attached to the distal side of the drill body; wherein the drill body forms a recessed part at the tip which is recessed toward the proximal side; the recessed part not only forms a bottom face which faces the distal side and which is orthogonal to the axis of the drill body, a pair of clamp faces which clamp and hold the cutting insert which inserts into the recessed part, and a pair of torque transmission faces which are crossed by and adjacent to each of the clamp faces and which transmit the rotary force of the drill body to the cutting insert, but is also provided with a slit which extends toward the proximal side in the axial direction so as to bifurcate the tip of the drill body from the bottom face; the cutting insert forms a pair of clamp receiving faces which are respectively pressed by the pair of clamp faces of the drill body, and a pair of torque receiving faces which are crossed by and adjacent to the clamp receiving faces and to which is transmitted the rotary force of the drill body from each of the paired torque transmission faces; and the crosshatch angles of the clamp receiving faces and the torque receiving faces which are adjacent in the cutting insert are formed smaller within a range of 2° or less than the crosshatch angles of the clamp faces and the torque transmission faces which are adjacent in the drill body.

In order to achieve the second objective, the indexable drill of the present invention forms at the distal side of the drill body an insertion hole which extends across the slit and whose inner surface is provided with a first female screw part and second female screw part, wherein it is preferable that the female screws of the first female screw part and the second female screw part be formed in mutually inverse directions.

In order to achieve the third objective, it is preferable that the indexable drill of the present invention fill at least part of the slit with resin.

In order to achieve the fourth objective, the indexable drill of the present invention forms tapered margins in the cutting insert whose outside diameters gradually decrease from the tip in the axial direction toward the proximal end, wherein with respect to the length range in the axial direction from the tip of the margin to its proximal end, the tapered part of a length range from at least the tip of the margin to ⅕ or more is considered as a first tapered part, the tapered part from the first tapered part to the proximal end of the margin is considered as a second tapered part, and the second tapered part is formed with a larger taper angle than the taper angle of the first tapered part.

According to the indexable drill of the present invention, the crosshatch angles of the clamp receiving faces and torque receiving faces of the cutting insert are formed smaller within a range of 2° or less than the crosshatch angles of the clamp faces and torque transmission faces of the drill body, with the result that when the cutting insert is mounted in the recessed part of the drill body, it is possible to obtain the strong adhesion of the torque transmission faces and torque receiving faces and to reliably transmit torque from the drill body to the cutting insert in comparison to the case where the mutual crosshatch angles are equal. Moreover, as the cutting insert is clamped and held so that the drill body elastically deforms and the clearances of the clamp faces and clamp receiving faces are gradually filled, it is possible to exert a large clamping force on the cutting insert, and to firmly integrate the cutting insert and drill body.

Moreover, when the cutting insert is mounted in the recessed part of the drill body, as the cutting insert is guided so that the clearances are filled due to the slight variance in the mutual crosshatch angles, it is possible to have the axis of the cutting insert and the axis of the drill body coincide, and to firmly hold the cutting insert in this state. Accordingly, it is possible to maintain a high degree of attachment rigidity and attachment accuracy, and to enhance the precision of machined holes.

Furthermore, as the first female screw part and second female screw part formed inside the insertion hole are made as reverse screws, even when the clamping screw which is screwed into the first female screw part contacts the screw part which is screwed into the second female screw part, it is possible to prevent the screw part from being driven and loosened by the rotation of the clamping screw, and to reliably enlarge the interstice of the slit, thereby enabling the cutting insert to be suitably attached to and removed from the recessed part of the drill body.

In addition, by filling at least part of the slit with resin, it is possible to prevent the ingestion of chip into the slit during cutting, and to prevent the infliction of flaws and the like on the inner surface of the workpiece. Furthermore, by filling the slit with resin, it is possible to prevent a resonance phenomenon during cutting, and to reduce cutting noise.

Furthermore, as the margins of the cutting insert form the taper angle of a second tapered part larger than that of a first tapered part, it is possible to maintain the clearance of the margin and the machined hole, to reduce cutting resistance and interference during withdrawal, and to stably conduct cutting.

DETAILED DESCRIPTION OF THE INVENTION

Below, the indexable drill pertaining to a first embodiment of the present invention is described with reference to FIG. 1 to FIG. 9.

Figure 1:
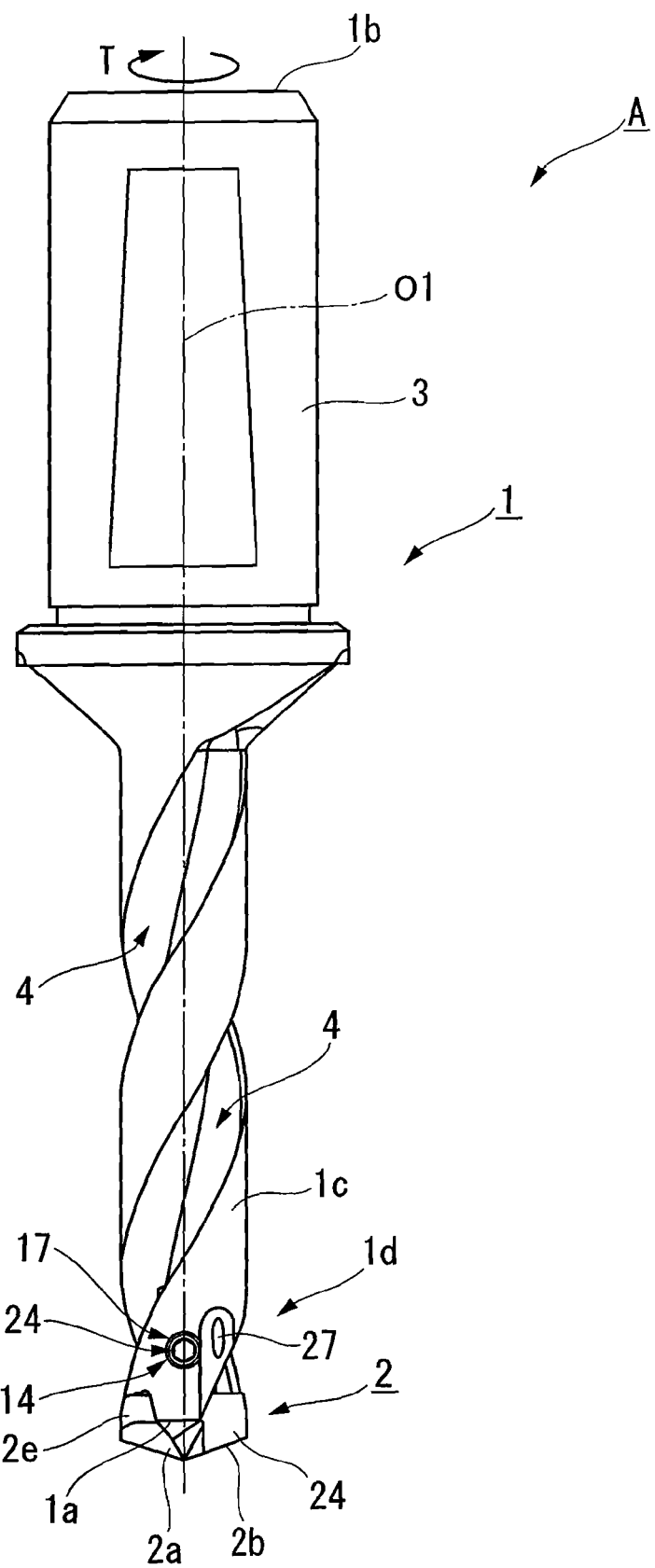
FIG. 1 is a side view showing the indexable drill pertaining to an embodiment of the present invention.

As shown in FIG. 1, an indexable drill A pertaining to an embodiment of the present invention is composed of a drill body 1 which rotates around axis O1 (drill rotation direction T) and which is formed in an approximately cylindrical rod shape, and a cutting insert 2 which has cutting edges 2b on a tip face 2a, and which is removably mounted onto the tip 1a side of the drill body 1.

The drill body 1 is provided with a shank 3 at its proximal end 1b side which is, for example, held by a chuck or the like of a machine tool, and its tip 1a side is formed into an approximately multistage cylinder shape with a contracted diameter relative to this shank 3. At the periphery of the tip 1a side of the drill body 1, a pair of chip discharge flutes 4 which open at tip face 1a are helically formed on mutually opposite sides with axis O1 in between so as to twist toward the backward side of rotational direction T while facing the proximal end 1b side in the direction of axis O1.

Figure 2:
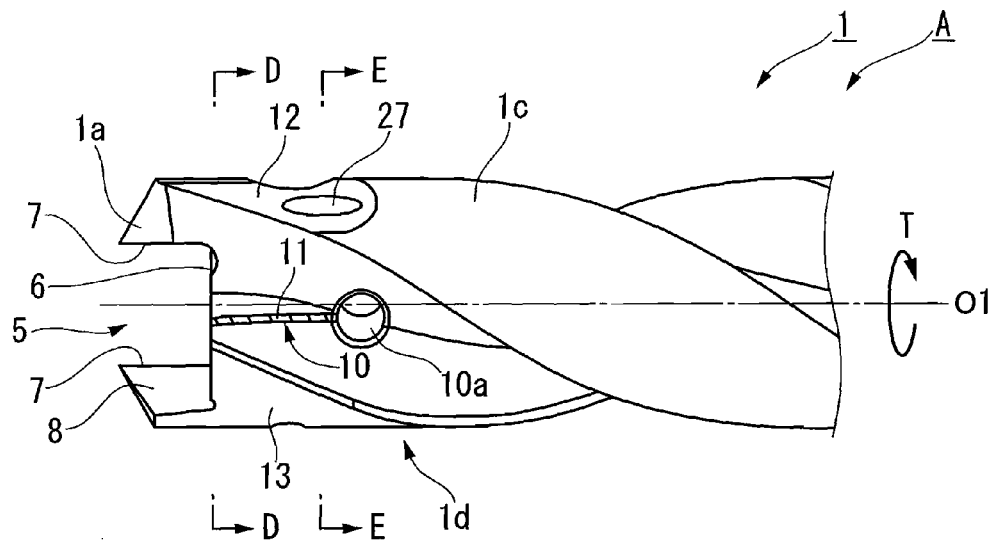
FIG. 2 is a side view showing the distal part of the drill body of FIG. 1.
Figure 3:
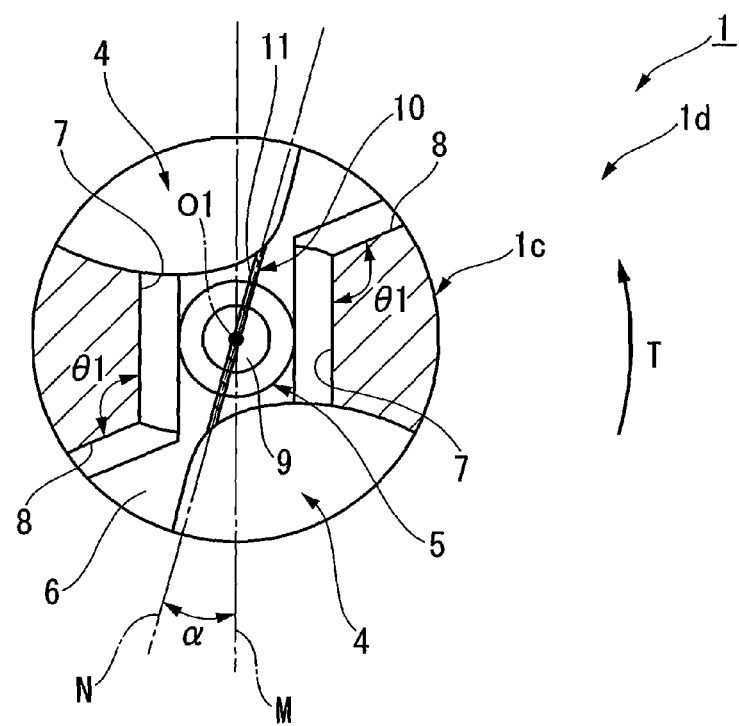
FIG. 3 is a cross-sectional view in the direction of arrows D-D of FIG. 2.

As shown from FIG. 1 to FIG. 3, a recessed part (insert mount) 5 which is formed so as to open at the tip 1a and to recess toward the proximal end 1b side is provided at the tip 1a of the drill body 1. In this recessed part 5 are formed a bottom face 6 which faces the tip 1a side and which crosses the axis O1 of the drill body 1, a pair of clamp faces 7 which arranged on mutually opposite sides with the axis O1 in between so as to face the inner circumferential side of the drill body 1 while crossing this bottom face 6, and which clamp and hold the cutting insert 2, and a pair of torque transmission faces 8 which are crossed by each of the clamp faces 7 and are adjacent thereto, and which transmit the rotational force of the drill body 1 to the cutting insert 2. Moreover, the paired torque transmission faces 8 arrranged on mutually opposite sides with the axis O1 in between so as to face the forward side of the rotational direction T of the drill body 1. Here, the crosshatch angles of the adjacent clamp faces 7 and drill transmission faces 8 of the drill body 1 are set in the range from 90° to 120°.

With respect to the torque transmission faces 8, the side which is opposite the side that crosses the clamp face 7 is crossed by an outer circumferential face 1c of the drill body 1. In contrast, with respect to the clamp faces 7, the side which is opposite the side that crosses the torque transmission face 8 does not reach the outer circumferential face 1c of the drill body 1, but is crossed by a wall face of the chip discharge flutes 4 which faces the backward side of the drill rotational direction T. Furthermore, the paired clamp faces 7 respectively incline toward the outer circumferential side of the drill body 1 as they approach the proximal end 1b side in the direction of the axis O1 (the angle of inclination relative to the axis O1 is in a range from 0° to a maximum of 1° or less), and the paired torque transmission faces 8 respectively incline toward the forward side of the drill rotational direction T as they approach the proximal end 1b side in the direction of the axis O1 (the angle of inclination relative to the axis O1 is in a range which is 30° or less and larger than 0°). As shown in FIG. 3, in the sectional view perpendicular to the axis O1, the pair of torque transmission faces 8 is provided so as to extend approximately in the diametric direction of the axis O1.

Meanwhile, an aperture 9 which is recessed toward the proximal end 1b side in the direction of the axis O1 is bored into the bottom face 6 which faces the tip 1a side in the direction of the axis O1. The section of this aperture 9 which is perpendicular to the axis O1 exhibits an approximately circular form centered on the axis O1, and is formed with the same inner diameter in the direction of the axis O1. In this instance, the inner diameter of the aperture 9 is set at a size where the inner circumferential face is located more toward the inner circumferential side of the drill body 1 than the wall faces of the chip discharge flutes 4.

Moreover, in the drill body 1, a slit 10 which extends from the bottom face 6 toward the proximal end 1b side in the direction of the axis O1 is provided so as to contain the axis O1 and to parallel with the axis O1. This slit 10 is formed so as to bifurcate the aperture 9, and opens onto and communicates with the chip discharge flutes 4. Furthermore, when viewed from the tip 1a side in the direction of the axis O1, as shown in FIG. 3, the extension direction N in which the slit 10 extends is arranged at a position which is turned farther toward the backward side of the drill rotation direction T around the axis O1 than the direction M which parallels the clamp faces 7 in the diametric direction relative to the axis O1. The crosshatch angle α of this extension direction N of the slit 10 and the direction M which parallels the clamp faces 7 is in a range which is 30° or less and larger than 0°. Moreover, the bottom part 10a of the slit 10 extends in the aforementioned extension direction N, the bottom part 10a forms a cross-sectional circular hole having an inner diameter which is larger than the width of the slit 10 (the interval between the pair of mutually opposing wall faces which configure the slit 10). Furthermore, resin 11 such as silicon resin which internally has suitable heat resistance and viscoelasticity is filled in this slit 10. This resin 11 is maintained in a state where it constantly filled in the interior of the slit 10 even when the size of the interval in the slit 10 is varied by a below-mentioned clamping screw 24.

Moreover, as shown in FIG. 2, by forming this slit 10 in the distal part 1d of the drill body 1, the distal part 1d of the drill body 1 is bifurcated into a first distal part 12 and second distal part 13 which sandwich the slit 10 including the aperture 9. In the first distal part 12, one of the clamp faces 7 and clamp transmission faces 8 which mutually cross on the bottom part 6 are provided, and in the second distal part 13, the other clamp face 7 and clamp transmission face 8 which mutually cross on the bottom part 6 are similarly provided.

Figure 4:
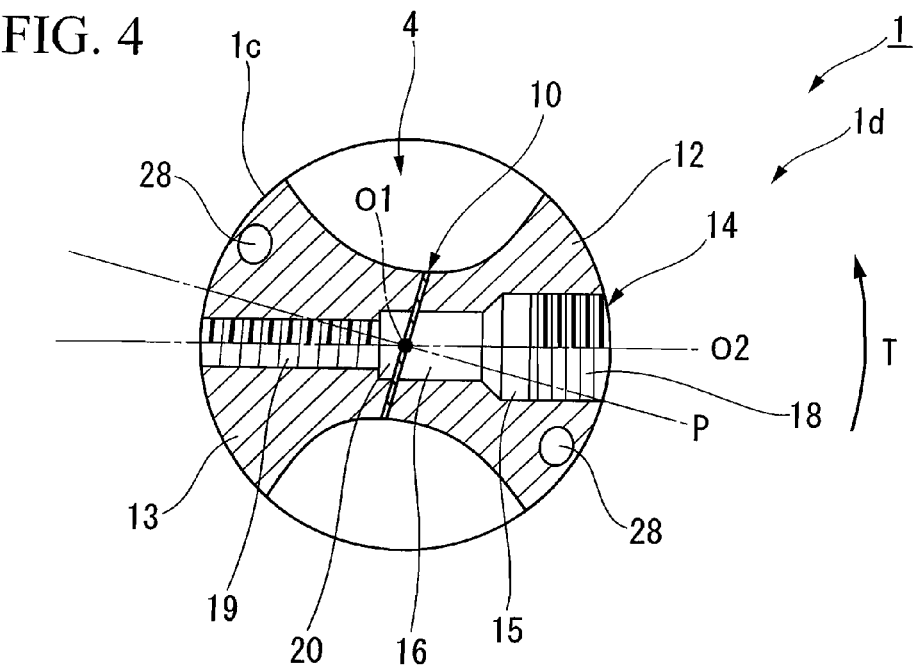
FIG. 4 is a cross-sectional view in the direction of arrows E-E of FIG. 2.
Figure 5:
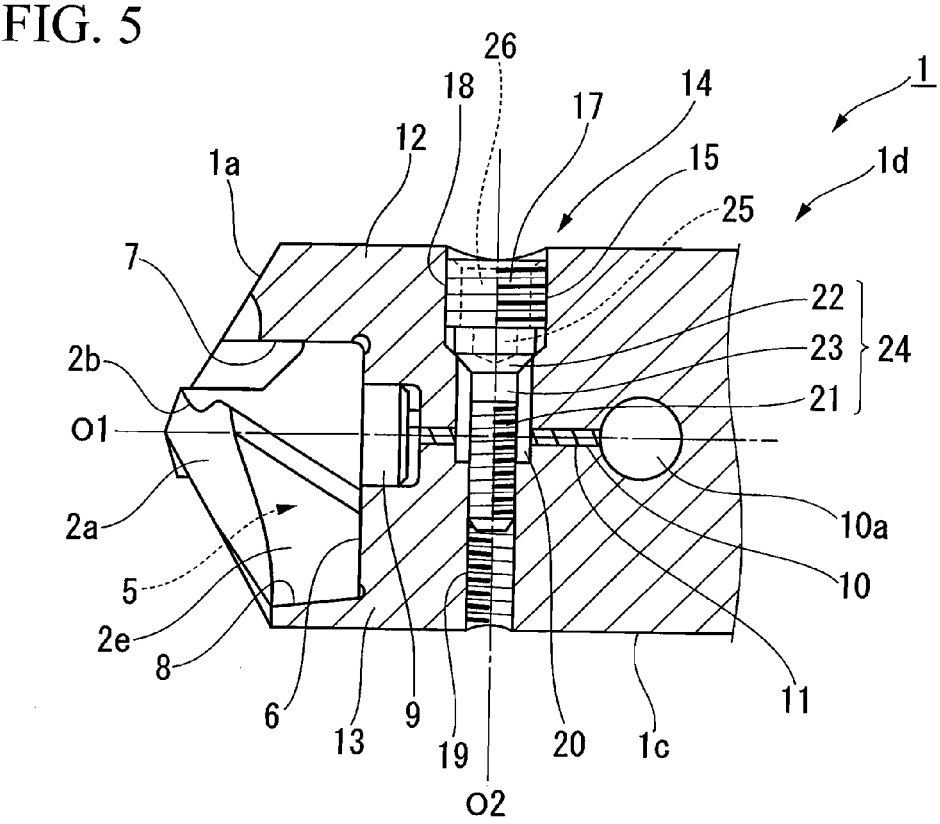
FIG. 5 is a lateral sectional view of the distal part of the drill body of FIG. 1.

Furthermore, as shown from FIG. 4 to FIG. 5, in the distal part 1d of the drill body 1, an insertion hole 14 which extends in direction O2 perpendicular to the axis O1 and crossing the slit 10 is provided at the position which is slightly more the proximal end 1b side of the direction of the axis O1 than the aperture 9. This insertion hole 14 is formed so as to penetrate the distal part 1d, and its outer circumferential edge in extension direction O2 respectively opens the outer circumferential face 1c of the first distal part 12 and outer circumferential face 1c of the second distal part 13. Moreover, as shown in FIG. 4, the extension direction O2 of this insertion hole 14 is arranged at a position where it is turned more toward the forward side of the drill rotation direction T than the widthwise direction P of the slit 10, and this insertion hole 14 is formed so as to diagonally cross the slit 10 in the widthwise direction P.

The portion of the insertion hole 14 located inside the first distal part 12 is composed of a housing 15 which extends at a fixed inner diameter from the outer circumferential face 1c of the first distal part 12 toward the inside of the extension direction O2 (the inner circumferential side in the diametric direction relative to the axis O1), and a first aperture 16 which communicates with this housing 15 and extends toward the inside of the drill body 1 at an inner diameter somewhat smaller than the inner diameter of the housing 15, and which opens onto the slit 10. Moreover, with respect to the part of the housing 15 which connects with the first aperture 16, the inner diameter of the housing 15 has a tapered form which gradually decreases its size as it moves toward the inside of the drill body 1. Furthermore, a second female screw part 18 in which the below-mentioned screw part 17 is screwed and fixed therein, is formed on the inner face of the housing 15 near the outer side in the extension direction O2.

Meanwhile, the portion of the insertion hole 14 located inside the second distal part 13 is composed of a first female screw part 19 and a second aperture 20 which communicates with this first female screw part 19. The first female screw part 19 extends at a fixed inner diameter from the outer circumferential face 1c of the second distal part 13 toward the inside of the extension direction O2 (the inner circumferential side in the diametric direction relative to the axis O1) and female screws are formed on the inner face thereof. The second aperture 20 extends toward the inside of the drill body 1 at an inner diameter somewhat larger than the inner diameter of the first female screw part 19 and approximately the same as the inner diameter of the first aperture 16, and opens onto the slit 10. In this instance, the second female screw part 18 and first female screw part 19 respectively form female screws in mutually opposite directions where, for example, the first female screw part 19 is a right-hand screw and the second female screw part 18 is a left-hand screw.

As shown in FIG. 1 and FIG. 5, a clamping screw 24 is inserted into the insertion hole 14 which is configured in the manner as described above. The a clamping screw 24 has a male screw part 21 and a head 22 in mutual concentric connection via a connecting part 23, and the head 22 exhibits an approximately multistage cylindrical shape which has a considerably wider diameter than the male screw part 21 and connecting part 23. In a state where this clamping screw 24 is inserted, the male screw part 21 is screwed into the first female screw part 19 of the insertion hole 14, and the head 22 is housed in the part of the housing 15 which is close to the inner side of the extension direction O2. On the end face of the head 22, a screw rotation hole (hexagonal hole) 25 in which a screw-driving tool such as a hexagonal wrench can be fitted is provided.

Furthermore, in the insertion hole 14, a screw part 17 which is formed in an approximately cylindrical shape, is housed in the part near the outside of the extension direction O2 so as to arrange opposite the head 22 of the clamping screw 24. The screw part 17 prevents the withdrawal of the clamping screw 24 and serves to increase the width of the slit 10 by contact with the head 22 of the clamping screw 24. On the outer circumferential face of this screw part 17 is formed a male screw which is capable of screwing into the second female screw part 18 formed in the housing 15, and this screw part 17 is fixed to the housing 15 by screwing this male screw into the second female screw part 18. Moreover, in the screw part 17, a through-hole 26 which penetrates the screw part 17 in the extension direction O2 of the insertion hole 14 is formed, and this through-hole 26 is a hexagonal hole (screw-driving hole). By fitting a hexagonal wrench into this hexagonal hole 26 and rotating it, the screw part 17 can be screwed into the housing 15. Here, the hexagonal hole 26 formed in the screw part 17 is given a size which enables passage of a hexagonal wrench that fits into the hexagonal hole 25 formed in the end face of the head 22 of the clamping screw 24, and the screw part 17 is made so that it is not driven even when the hexagonal wrench fitted into the hexagonal hole 25 of the clamping screw 24 is rotated.

Moreover, as shown in FIG. 1, FIG. 2 and FIG. 4, in the distal part 1d of the drill body 1, a coolant discharger 27 which is opened by cutting out the outer circumferential face 1c of the drill body 1, and which supplies coolant to the cutting region, is formed between the pair of chip discharge flutes 4. This coolant discharger 27 communicates with a coolant hole 28 which extends from the proximal end 1b of the drill body 1 along the axis O1 and which bifurcates in midcourse.

Meanwhile, as shown in FIG. 1 and FIG. 5 to FIG. 8, the cutting insert 2 which is attached by fixing to the recessed part 5 of the drill body 1, has an insert body 2c formed from cemented carbide such as sintered hard alloy. Cutting edges 2b are formed on the tip face 2a of this insert body 2c. When the insert body 2c is in a state of attachment to the recessed part 5 of the drill body 1, the tip face 2a which is oriented toward the distal side in the direction of the axis O1 exhibits a V-shaped form which gradually recedes as it approaches the outer circumferential side of the drill body 1 from the axis O1. The cutting insert 2 has a pair of cutting faces 2f approximately shaped as concave curves which are oriented toward the drill rotation direction T forward side, and which smoothly run to the tip of the wall faces of the chip discharge flutes 4, and these cutting faces 2f are crossed by the tip face 2a, the proximal end face 2d of the insert body 2c which is orthogonal to the axis O1, and by an outer circumferential face 2e which faces the outer circumferential side of the drill body 1. The cutting edge 2b is formed at the ridgeline where this cutting face 2f and tip face 2a cross.

Figure 6:
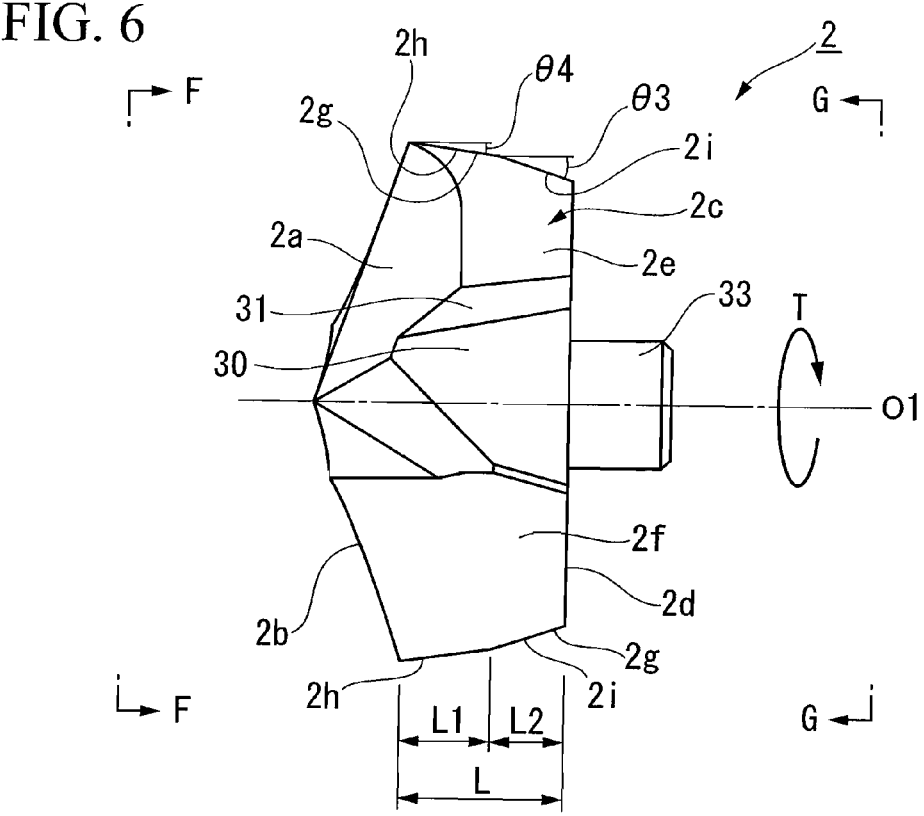
FIG. 6 is a view showing the cutting inserts of FIG. 1.
Figure 7:
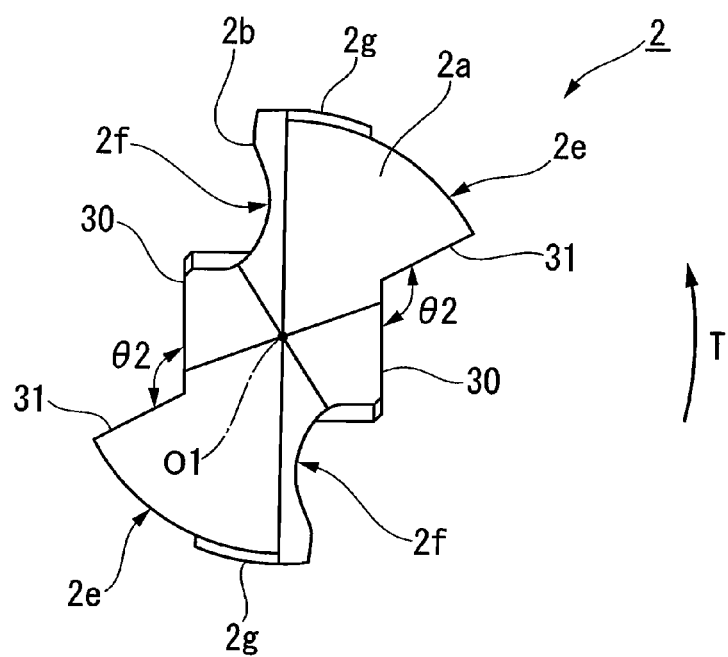
FIG. 7 is a plan view in the direction of arrows F-F of FIG. 6.
Figure 8:
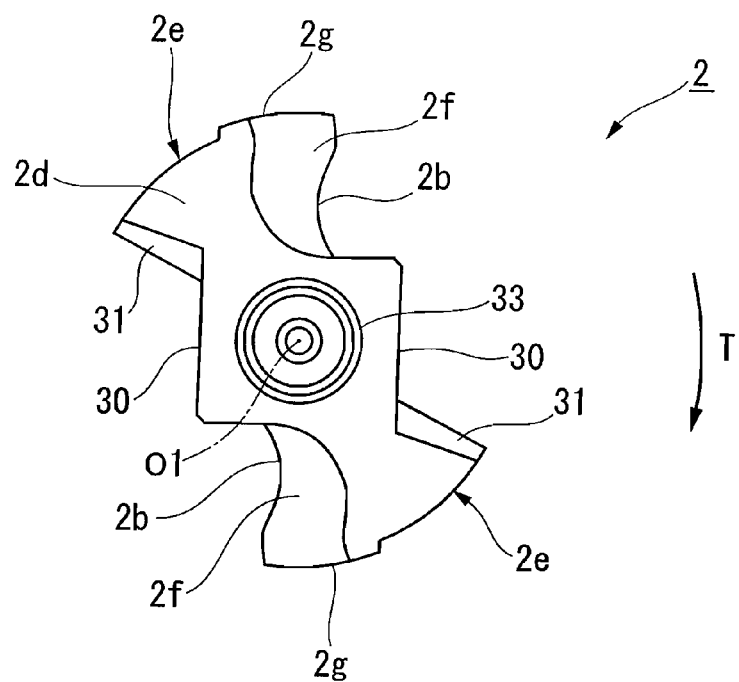
FIG. 8 is a plan view in the direction of arrows G-G of FIG. 6.

At the outer circumferential faces 2e of the cutting insert 2, margins 2g which are formed so as to project toward the outer circumferential side along the ridgelines where the outer circumferential faces 2e and cutting faces 2f cross, are provided. As shown in FIG. 6, these margins 2g are formed with a tapered shape so that the outside diameter of the cutting insert 2 gradually decreases from a tip position connecting with the tip face 2a toward a proximal end position connecting with the proximal end face 2d in the direction of the axis O1. Furthermore, with respect to a range L in the direction of the axis O1 from the tip face 2a to the proximal end face 2d, the tapered part of range L1 from at least the tip face 2a until L/5 or more is considered as a first tapered part 2h, the tapered part of range L2 from this first tapered part 2h until the proximal end face 2d is considered as a second tapered part 2i, and the second tapered part 2i is formed with a larger taper angle θ3 than the taper angle θ4 of the first tapered part 2h.

Meanwhile, a pair of clamp receiving faces 30 which cross the tip face 2a and proximal end face 2d, and a pair of torque receiving faces 31 which similarly cross the tip face 2a and proximal end face 2d, are formed in this cutting insert 2. In a state where the cutting insert 2 is attached to the drill body 1, the paired clamp receiving faces 30 arranged on mutually opposite sides with the axis O1 in between so as to respectively face the outer circumferential side of the drill body 1. In contrast, the torque receiving faces 31 arranged on mutually opposite sides with the axis O1 in between so as to respectively face the backward side of the drill rotation direction T. Here, the pair of clamp receiving faces 30 are respectively crossed by and adjacent to the backward side of the drill rotation direction T of the pair of torque receiving faces 31 (the inner circumferential side of the drill body 1), and the crosshatch angles (the crosshatch angles when viewed from the cross section orthogonal to the axis O1) θ2 of the mutually intersecting clamp receiving faces 30 and torque receiving faces 31 are formed within a range of 2° or less which are smaller than the crosshatch angles θ1 of the adjacent clamp faces 7 and torque transmission faces 8 of the drill body 1 shown in FIG. 3.

Moreover, while the side of the torque receiving face 31 which crosses the clamp receiving face 30 and its opposite side intersect at the outer circumferential face 2e of the insert body 2c, the side of the clamp receiving face 30 which crosses the torque receiving face 31 and its opposite side are crossed by the cutting faces 2f toward the drill rotation direction T forward side without reaching the outer circumferential face 2e of the insert body 2c. When viewed from the cross section orthogonal to the axis O1, the pair of torque receiving faces 31 extends approximately in the diametric direction transiting the axis O1. Furthermore, the paired clamp receiving faces 30 are respectively inclined (the angle of inclination relative to the axis O1 is within a range of greater than 0° to 1° or less, which is a value approximately identical to the angle of inclination of the clamp faces 7 of the aforementioned insert mount 6) so as to approach the outer circumferential side of the drill body 1 as they approach the proximal end side in the direction of the axis O1. On the other hand, the paired torque receiving faces 31 are respectively inclined (the angle of inclination relative to the axis O1 is within a range of greater than 0° to 30° or less, which is a value approximately identical to the angle of inclination of the torque transmission faces 8 of the insert mount 6) so as to approach the drill rotation direction T forward side as they approach the proximal end side in the direction of the axis O1.

As shown in FIG. 6, at the proximal end face 2d of the insert body 2c, a shaft 33 which projects toward the proximal end side in the direction of the axis O1 is formed. The section of this shaft 33 which is orthogonal to the axis O1 exhibits an approximately circular shape centered on the axis O1, and its outside diameter is formed so as to be fixed in the direction of the axis O1. Moreover, the outside diameter of the shaft 33 is given a size such that its outer circumferential face is located at the inner circumferential side of the drill body 1 compared to the part of the cutting face 2f which crosses the proximal end face 2d.

Next, a method for attaching the cutting insert 2 of the indexable drill A with the above configuration into the recessed part 5 of the drill body 1, and for machining a workpiece will be explained.

First, a hexagonal wrench is fit into the hexagonal hole 25 of the clamping screw 24 which is inserted into the insertion hole 14 of the drill body 1, via the through-hole 26 of the screw part 17 arranged opposite the head 22. The hexagonal wrench is then rotated, thereby rotating the clamping screw 24 in one direction. As a result of this unidirectional rotation, the clamping screw 24 moves toward the outer side of the extension direction O2 of the insertion hole 14, and its head 22 contacts the screw part 17 which is fixed to the housing 15. At this time, at the distal part 1d of the drill body 1, the first distal part 12 and second distal part 13 which are bifurcated with the slit 10 in between elastically deform so as to mutually separate, and the one clamp face 7 and torque transmission face 8 located on the first distal part 12 side and the other clamp face 7 and torque transmission face 8 located on the second distal part 13 side mutually separate. By further rotating the clamping screw 24 in a state where the head 22 is in contact with the screw part 17, the first distal part 12 and second distal part 13 undergo further elastic deformation, and the interstice of the slit 10 becomes larger.

Figure 9:
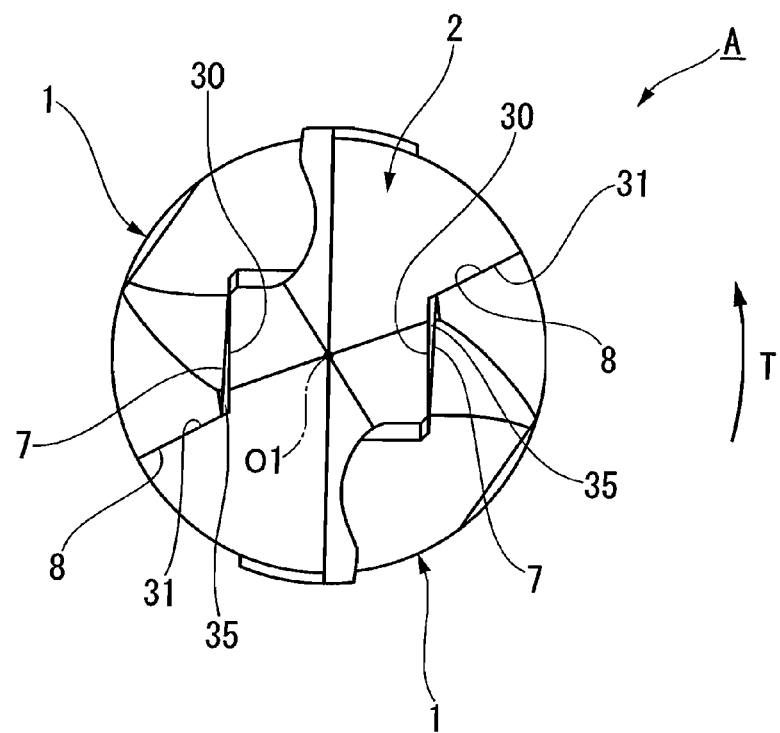
FIG. 9 is a view from the distal end side showing the state where the cutting insert is inserted into the recessed part of the drill body.

In this manner, the recessed part 5 of the drill body 1 is opened, enabling insertion of the cutting insert 2 into the recessed part 5. At this stage, as shown in FIG. 9, the cutting insert 2 is inserted into the recessed part 5 by steadily sliding it toward the proximal side in the direction of the axis O1 so that the pair of clamp receiving faces 30 and the pair of clamp faces 7 of the drill body 1 are opposite each other. At this time, the shaft 33 formed in the proximal end face 2d of the insert body 2c is inserted into the aperture 9 formed in the bottom face 6, and the bottom face 6 and the proximal end face 2d of the insert body 2c are closely contacted. Additionally, the cutting faces 2f of the insert body 2c are respectively oriented toward the forward side of the drill rotation direction T, and link with the chip discharge flutes 4, while the clamp receiving faces 30 of the insert body 2c are respectively arranged opposite the clamp faces 7, and the torque receiving faces 31 and torque transmission faces 8 arranged opposite each other. In this state, as shown in FIG. 9, since the crosshatch angles θ2 of the clamp receiving faces 30 and torque receiving faces 31 of the cutting insert 2 are formed within a range of 2° or less which is smaller than the crosshatch angles θ1 of the clamp faces 7 and torque transmission faces 8 of the drill body 1, a minute clearance 35 is produced between the clamp faces 7 and clamp receiving faces 30 which arranged opposite each other.

Next, in a manner similar to when the clamping screw 24 was rotated in one direction, the hexagonal wrench is fitted into the hexagonal hole 25 of the clamping screw 24, and the clamping screw 24 is rotated in the other direction. As a result, the clamping screw 24 is moved inside the insertion hole 14, whereby the head 22 is made to contact the tapered wall face formed in the housing 15. At this time, the first distal part 12 and second distal part 13 of the drill body 1 are elastically deformed so as to approach each other. As a result of this elastic deformation, first, the inner circumferential face of the aperture 9 of the drill body 1 closely contacts and presses the outer circumferential face of the shaft 33 of the insert body 2c which is inserted into this inner circumferential face, whereby the aperture 9 firmly fastens and holds the shaft 33. Furthermore, the paired clamp faces 7 of the recessed part 5 respectively contact and press the paired clamp receiving faces 30 of the insert body 2c, whereby the cutting insert 2 is firmly fixed to the interior of the recessed part 5 of the drill body 1.

Here, the crosshatch angles θ2 of the clamp receiving faces 30 and torque receiving faces 31 of the cutting insert 2 are formed smaller within a range of 2° or less which is smaller than the crosshatch angles θ1 of the clamp faces 7 and torque transmission faces 8 of the drill body 1, and the mutual crosshatch angles θ1 and θ2 are formed so as to slightly differ, with the result that when the clamp faces 7 press against the clamp receiving faces 30, the first distal part 12 and second distal part 13 elastically deform, the clearance 35 between a clamp receiving face 30 and clamp face 7 gradually decreases, and their mutual contact area grows larger as the clamping screw 24 is screwed in. Moreover, at this time, not only does the contact area gradually grow larger, but also the cutting insert 2 is slightly displaced in the radial direction of the drill body 1, and the axis O1 of the cutting insert 2 gradually coincides with the axis O1 of the drill body 1 in conjunction with this displacement. Furthermore, by screwing in the clamping screw 24, in conjunction with the gradual increase in the contact area of the clamp faces 7 and clamp receiving faces 30, the torque transmission faces 8 of the drill body 1 press against the torque receiving faces 31 of the cutting insert 2, and closely and strongly contact thereto. Ultimately, the clamp faces 7 and clamp receiving faces 30 undergo complete interfacial contact, the clearance 35 is eliminated, and the cutting insert 2 is clamped and held by the drill body 1.

At the stage where the cutting insert 2 is held in the drill body 1 in this manner, the chuck 3 is supported by the main spindle of a machine tool, for example, the cutting edge 2b cuts into a workpiece while rotating around the axis O1, and machining of the workpiece is conducted by the indexable drill A.

Thus, according to the aforementioned indexable drill A, by forming the crosshatch angles θ2 of the clamp receiving faces 30 and torque receiving faces 31 of the cutting insert 2 smaller within a range of 2° which is less than the crosshatch angles θ1 of the clamp faces 7 and torque transmission faces 8 formed on the tip 1a side of the drill body 1, it is possible to elastically deform the drill body 1 so as to gradually fill the mutual clearances 35 of the clamp faces 7 and clamp receiving faces 30, and to clamp and hold the cutting insert 2. By this means, in a state where the clamp faces 7 and clamp receiving face 30 are in complete facial contact, it is possible to reliably clamp and hold the cutting insert 2 by exerting great cramping force, and closely and strongly contact the torque transmission faces 9 and torque receiving faces 31. As a result, torque is reliably transmitted in rotational direction T from the drill body 1 to the cutting insert 2.

Furthermore, as the mutual clearance 35 of the clamp face 7 and clamp receiving face 30 is gradually reduced, and as the contact area grows larger, the cutting insert 2 is guided and displaced so that its axis O1 coincides with the axis O1 of the drill body 1, with the result that at the stage where the cutting insert 2 is clamped and held, it is possible to have both axes O1 reliably coincide. Accordingly, it is possible to ensure a high degree of attachment rigidity and attachment accuracy, and to enhance the accuracy of the machined hole.

Furthermore, in the aforementioned indexable drill A, when the first distal part 12 and second distal part 13 are separated by loosening the clamping screw 24 in order to attach the cutting insert 2 to the tip 1a side of the drill body 1, since the second female screw part 18 into which the screw part 17 is screwed and the first female screw part 19 into which the clamping screw 24 is screwed are made as reverse screws, it is possible to prevent the screw part 17 from being driven and loosened even when the clamping screw 24 is further rotated in a state where the head 22 of the clamping screw 24 is in contact with the screw part 17. As a result, it is possible to reliably enlarge the interstice of the slit 10, and to enable the easy attachment and removal of the cutting insert 2.

Moreover, in the aforementioned indexable drill A, by filling the slit 10 with resin 11, it is possible to prevent the occurrence of a resonance phenomenon inside the slit 10 during cutting and the occurrence of large high-pitched cutting noise, thereby enabling mitigation of cutting noise. Furthermore, it is possible to prevent the ingestion of chip into the slit 10.

Furthermore, in the aforementioned indexable drill A, the margins 2g of the cutting insert 2 possess a first tapered part 2h and second tapered part 2i, and the taper angle θ3 of the second tapered part 2i is formed larger than the taper angle θ4 of the first tapered part 2h. As a result, it is possible to reduce the contact portion of the margin 2g and the inner face of the workpiece, thereby enabling mitigation of cutting resistance during cutting and interference during withdrawal.

The present invention is not limited by the aforementioned individual embodiment, and may be appropriately modified within a scope that does not deviate from its intent. For example, in the present embodiment, the resin 11 which fills the slit 10 is made of silicon resin, but one is not limited thereto, and there is no particular restriction on the type of resin. Moreover, a description was made wherein the resin 11 fills the entirety of the slit 10, but it is also acceptable to have it partially filled with the resin 11 so as to reduce the cutting noise.

The invention claimed is:

1. An indexable drill comprising:
an approximately cylindrical rod-like drill body which rotates around an axis; and
a cutting insert which has cutting edges at a tip and which is removably attached to a distal side of said drill body;
wherein said drill body comprises:
a recessed part at the tip which is recessed toward a proximal end side; the recessed part forms a bottom face which faces said distal side and which is orthogonal to the axis of said drill body;
a pair of clamp faces that clamp and hold a portion of said cutting insert which inserts into said recessed part;
a pair of torque transmission faces which are crossed by and adjacent to each of the clamp faces and which transmit the rotary force of said drill body to said cutting insert;
a slit which extends toward the proximal end side in said axial direction so as to bifurcate the tip of said drill body from said bottom face; and
an insertion hole that is formed at the distal side of said drill body, said insertion hole extending across said slit and having an inner surface that comprises a first female screw part and a second female screw part, wherein a female screw of said first female screw part and a female screw of said second female screw part are formed in mutually inverse directions;
wherein said cutting insert comprises:
a pair of clamp receiving faces which are respectively pressed by said pair of clamp faces of said drill body;
a pair of torque receiving faces which are crossed by and adjacent to the clamp receiving faces and to which is transmitted the rotary force of said drill body from each of said paired torque transmission faces; and
crosshatch angles of said clamp receiving faces and said torque receiving faces which are adjacent in said cutting insert are formed smaller within a range of 2° or less than the crosshatch angles of said clamp faces and said torque transmission faces which are adjacent in said drill body.

2. The indexable drill according to claim 1, wherein at least part of said slit is filled with resin.

3. The indexable drill according to claim 1, further comprising tapered margins formed in said cutting insert whose outside diameters gradually decrease from the tip of said cutting insert in said axial direction toward the proximal end, wherein the tapered margins comprise:
a first tapered part being a length in said axial direction from at least a tip of said margin to ⅕ or more toward the proximal end; and
a second tapered part starting at the first tapered part to the proximal end of said margin,
wherein the second tapered part is formed with a larger taper angle than a taper angle of said first tapered part.

4. The indexable drill according to claim 1, wherein the insertion hole further comprises a screw-stopping part that is contacted by a head of a clamping screw when said clamping screw is loosened, whereby interstice of the slit is enlarged providing suitable attachment and removal of the cutting insert in the recessed part of the drill body.

* * * * *